United States Patent [19]

Ratner

[11] Patent Number: 4,841,615
[45] Date of Patent: Jun. 27, 1989

[54] METHOD FOR MODIFYING STATORS

[76] Inventor: Michael Ratner, 67-33 170th St., Flushing, N.Y. 11365

[21] Appl. No.: 164,564

[22] Filed: Mar. 7, 1988

[51] Int. Cl.⁴ .............................................. B21K 3/00
[52] U.S. Cl. .............................. 29/156.8 R; 29/402.06; 29/402.15; 29/525.1; 416/244 A
[58] Field of Search .................... 29/156.8 R, 156.4 R, 29/156.8 C, 156.8 F–156.8 T, 402.06, 402.07, 402.15, 426.4, 526 R, 526 A; 416/244 A

[56] References Cited
U.S. PATENT DOCUMENTS
4,692,977  9/1987  Maze .............................. 29/156.8 R Primary Examiner—Howard N. Goldberg
Assistant Examiner—Irene Cuda
Attorney, Agent, or Firm—Bernard Lieberman

[57] ABSTRACT

A method for modifying the stator of an automotive torque converter by using an adaptor is discussed. The adapter includes a casting or machined part having a cylindrical portion on a flange for bearing against a surface of the stator. The stator has its lip removed, after which the adapter is coaxially aligned with the stator support shaft and the inner race splined thereto and then fastened to the stator fasteners extending through the flange and into the stator. The modified stator can now accommodate a heavier duty thrust bearing which improves reliability of the torque converter.

5 Claims, 3 Drawing Sheets

FIG. 3
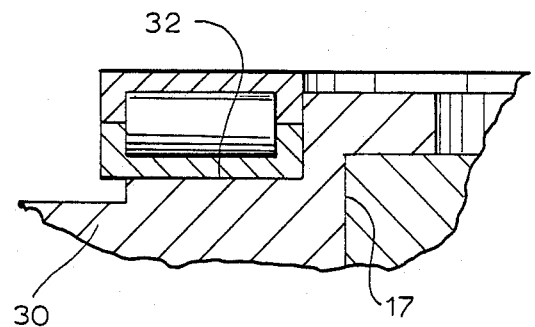
FIG. 4
PRIOR ART
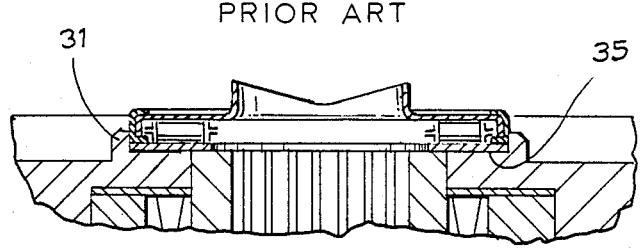
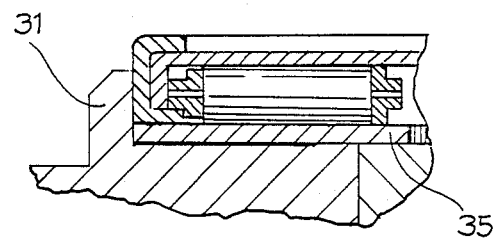
FIG. 5
PRIOR ART

FIG. 6
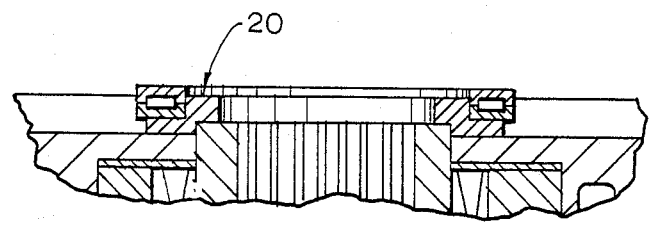
FIG. 7
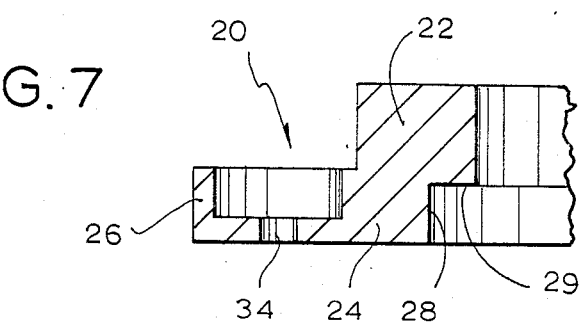
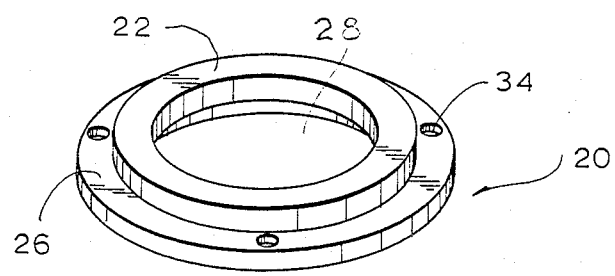
FIG. 8

METHOD FOR MODIFYING STATORS

BACKGROUND OF THE INVENTION

This invention relates to the repair of and rebuilding of torque converters primarily used in automotive vehicles and, more particularly, to an adapter used in conjunction with a method for modifying the stator of a torque converter.

DESCRIPTION OF THE PRIOR ART

Automatic transmissions for automotive vehicles have employed a stator as a component in the torque converter. The stator is a complex and costly vane casting and is provided with a splined inner race, which permits a one-way rotation, thus affording the function as a torque converter in the conventional manner. In the older-type automatic transmissions, the stators included needle thrust bearings which operated only for a limited period of time, after which wear caused premature failure due to deficiencies in the original design and bearing capacity. In newer transmissions unitized heavier duty bearings have been utilized which solved the failure problems, but there exist untold numbers of older automatic transmissions still in use in various makes and models of automotive vehicles. When these older automatic transmissions require repair, rebuilding is undertaken with the simple expedient of providing an entire new stator assembly. This creates a present day problem because, in many cases, a replacement stator is not available and, in any event, such a stator assembly still suffers from the relatively limited period of efficient operation mentioned above, together with a high risk of catastrophic failure. When the torque conversion afforded by the stator becomes ineffective due to wear on the stator, operation of the automatic transmission is wanting and defective. When thrust bearing failure occurs, the entire torque converter fails, causing transmission failure and the vehicle to be undriveable. Further, for some originally expensive makes and models of automatic transmissions, the cost of a new stator assembly is prohibitive.

SUMMARY OF THE INVENTION

The present invention overcomes the disadvantages of the prior art of rebuilding torque converters by providing an adapter for a heavier thrust bearing and a method of rebuilding a stator. To this end, the lip on an existing stator is machined or ground off and an adapter is inserted on the shaft opening of the stator, which may have become worn to some degree of eccentricity. The adapter is a cylindrical member for receiving the shaft and extends a limited distance into the stator opening due to partial removal of that portion of the stator surface to which the adapter is to be attached. Fasteners, such as nails, pins, screws or the like, may be used to fasten the adapter to the stator. A one-way bearing race assembly is inserted into the shaft opening of the stator and bears against the adapter. A new heavier duty thrust bearing can now be mounted on the adapter affording a more reliable torque converter assembly.

BRIEF DESCRIPTION OF THE DRAWINGS

FIG. 3 is an enlarged fragmentary view of the existing newer stator assembly

FIG. 4 is a sectional detail view of the older stator to be adapted in accordance with the invention;

FIG. 5 is an enlarged fragmentary view of the older stator assembly showing a raised circumferential lip inside of which the old-style needle thrust bearing is situated;

FIG. 6 is a sectional view of the older stator adapted and fitted with the adapter of this invention and utilizing a unitized thrust bearing assembly as presently used on the newer stator assemblies;

FIG. 7 is an enlarged fragmentary view of the adapter; and,

FIG. 8 is a perspective view of the adapter.

DETAILED DESCRIPTION OF THE INVENTION

Figure 1:
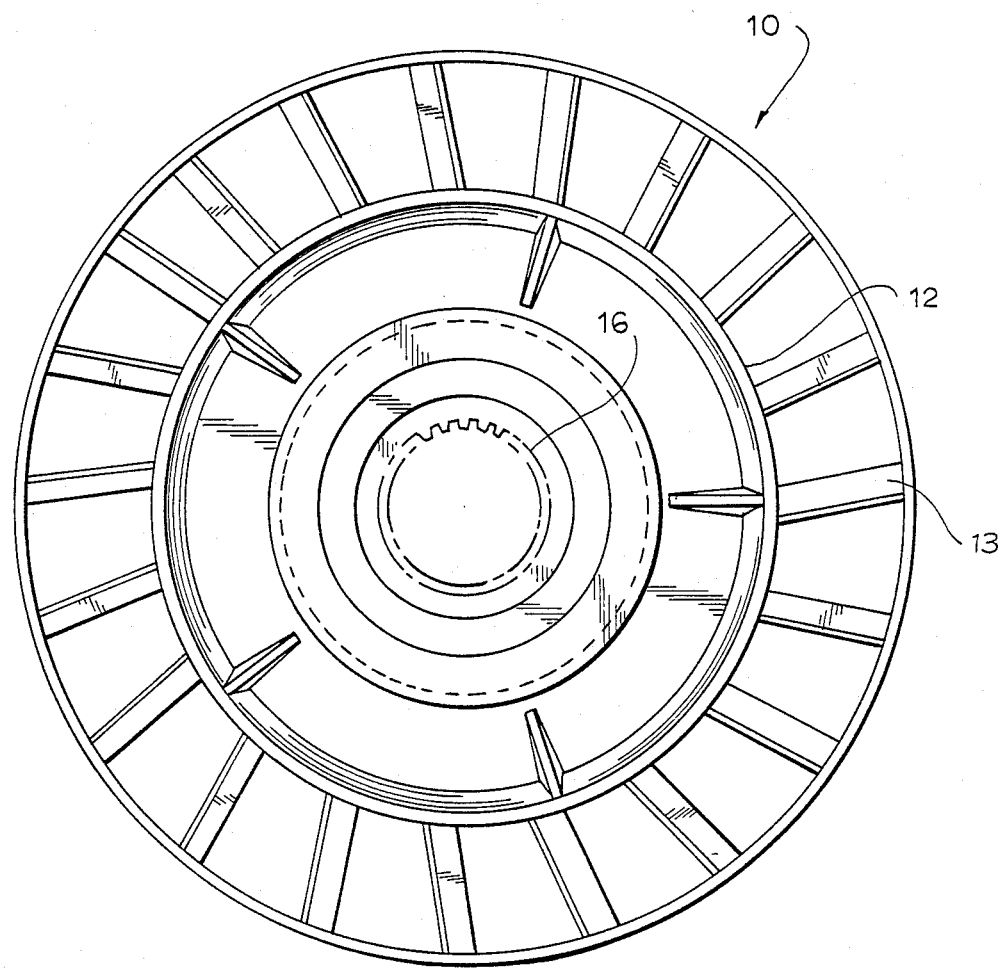
FIG. 1 is an elevational view of a stator used in a torque converter.
Figure 2:
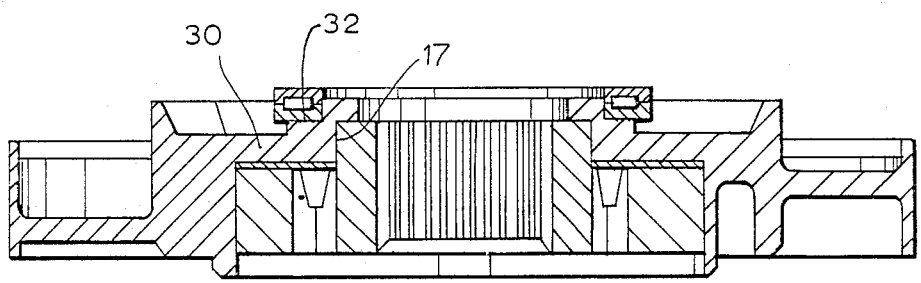
FIG. 2 is a diametrical sectional view of the existing newer stator assembly

With continuing reference to the accompanying drawings, wherein like reference numerals designate similar parts throughout the various views, reference numeral 10 generally designates the stator of a torque converter. The stator 10 includes a casting 12 provided with vanes 13 for enabling the stator to function as a torque converter. This is achieved in the well known manner by limiting the stator to rotation in one direction only. To accomplish this function a splined inner race 16 is provided for one-way clutch action, the construction of which is conventional.

In use, the stator becomes worn and the inner race becomes inoperative with possible eccentricities of the inner race 16 of the stator due to wear on wall 17. To this end, the adapter 20 (FIGS. 7 and 8) is employed in conjunction with a method of rebuilding the stator 10.

The adapter 20 is a casting or machining made of any metal, such as aluminum or steel, or may be molded from a sintered powdered metal or from any well-known plastic, and, it includes a part 22 having a cylindrical portion 24 and an integral flange 26.

The part 22 is provided with an opening 28 through which a shaft extends on which the conventional inner race is mounted and adapted to bear against flange 29 of the adapter 20.

In carrying out the invention, the retaining lip 31 is removed from the stator 10, allowing the flange 26 to lie flush against the surface 32 of the stator 10. Then, fasteners are inserted in a very simple and rapid manner into opening 34 in the flange 26 and the adapter is secured by suitable means, such as screws, to the stator. Welding is proscribed, because of the change of shape which could occur due to the heat of welding applied to the stator. Such untoward heat could result in distortion of the stator, requiring remachining to reestablish the precise dimensions of the stator. Alternatively the entire stator may have to be replaced. Moreover, welding is a costly and time consuming operation unlike the methods of rebuilding the stator in accordance with the invention.

The unitized thrust bearing fits around part 22 and on the flange 26. Unless the adapter 20 is fitted, there is no way a heavy duty bearing can be employed in early units which are prone to early catastrophic failures of the entire torque converter. Using the late heavy duty bearings solves most of the catastrophic failure problems and vastly increases unit reliability at very low cost, namely, adapter 20, new bearing and minimal labor.

Another significant advantage of the adapter of this invention lies in its function to eliminate any eccentricities or undue wear in the stator race piloting opening which occurs in the normal operation of the torque converter. This is accomplished in a dual-fold manner. Firstly, by producing the adapter with its center opening 28 to the required precision tolerances of the inner race passing partly therethrough, the adapter acts to "true" the rotation of the race and thusly provide a pilot diameter for this purpose. Secondly, by removing a small section of the surface 32, preferably so that it is substantially flush with section 35 of top surface 32 of the stator, not only does the adapter fit properly to this surface, but it serves to provide a significant portion of the necessary piloting diameter for the inner race, thereby reestablishing the proper piloting of said race. As pointed out above, wear of the surfaces of the stator, and particularly the walls of the race opening, produce eccentric rotation of the race. The instant adapter eliminates this problem.

After the adapter has been fastened to the stator, the inner race is inserted within the opening against the adapter and the torque converter can be assembled.

What is claimed is:

1. A method of rebuilding a stator of a torque converter, said stator having a lip, a shaft opening and a surface, comprising the steps of removing the lip from the surface of the stator, then placing an adapter centrally on or within the shaft opening of the stator with a flange of the adapter lying flush against a surface of the stator and, thereafter, fastening said adapter to said stator.

2. A method according to claim 1, wherein the step of removing said lip includes machining said lip off said stator.

3. A method according to claim 1, wherein said fastening step includes inserting fasteners through said flange and into said stator.

4. A method according to claim 1, wherein said fastening step includes inserting fasteners through said flange and into said stator and said removing step including machining said lip off of said stator.

5. A method according to claim 4, which includes machining part of said stator surface after said lip has been removed.

* * * * *